Patented Aug. 7, 1951

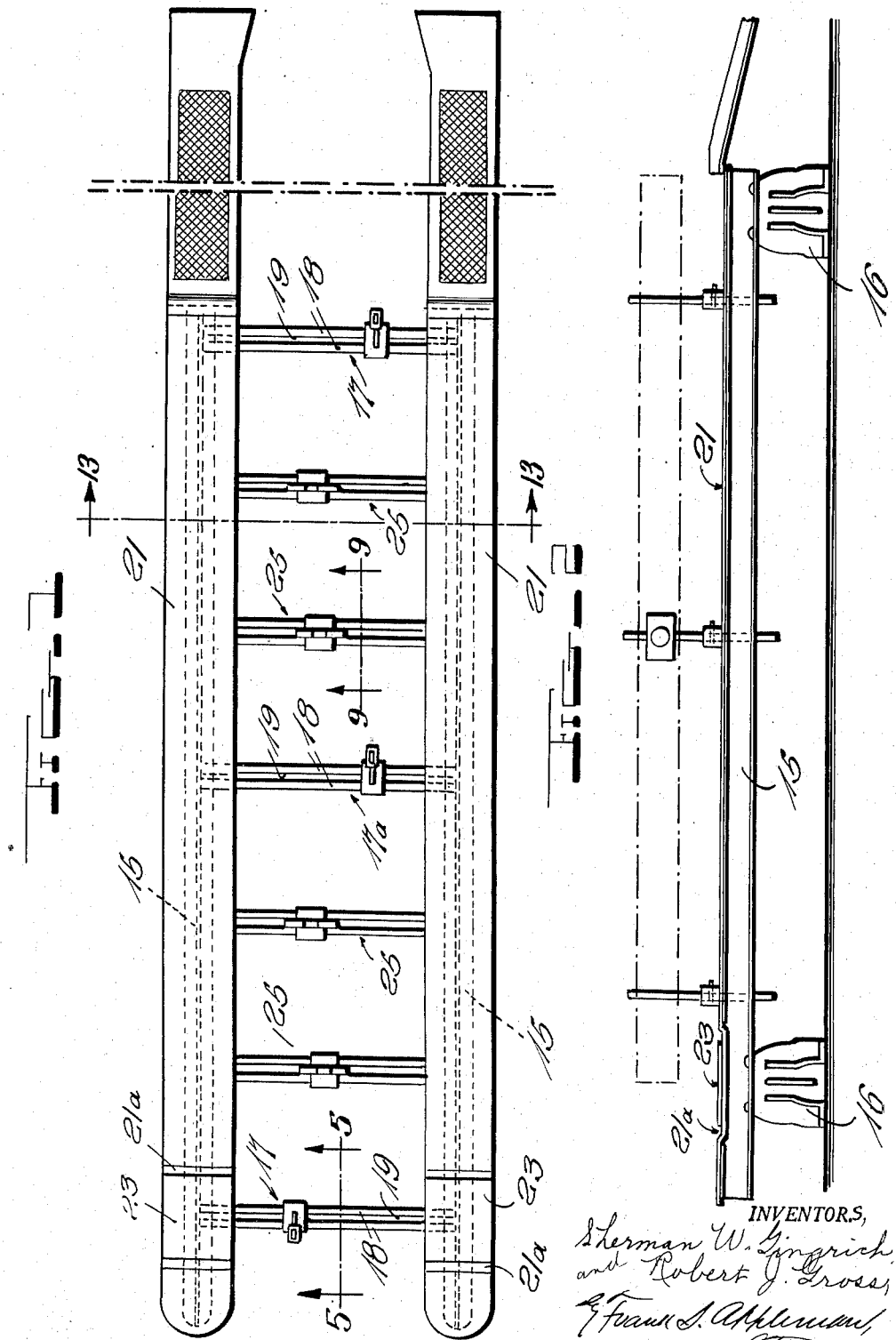

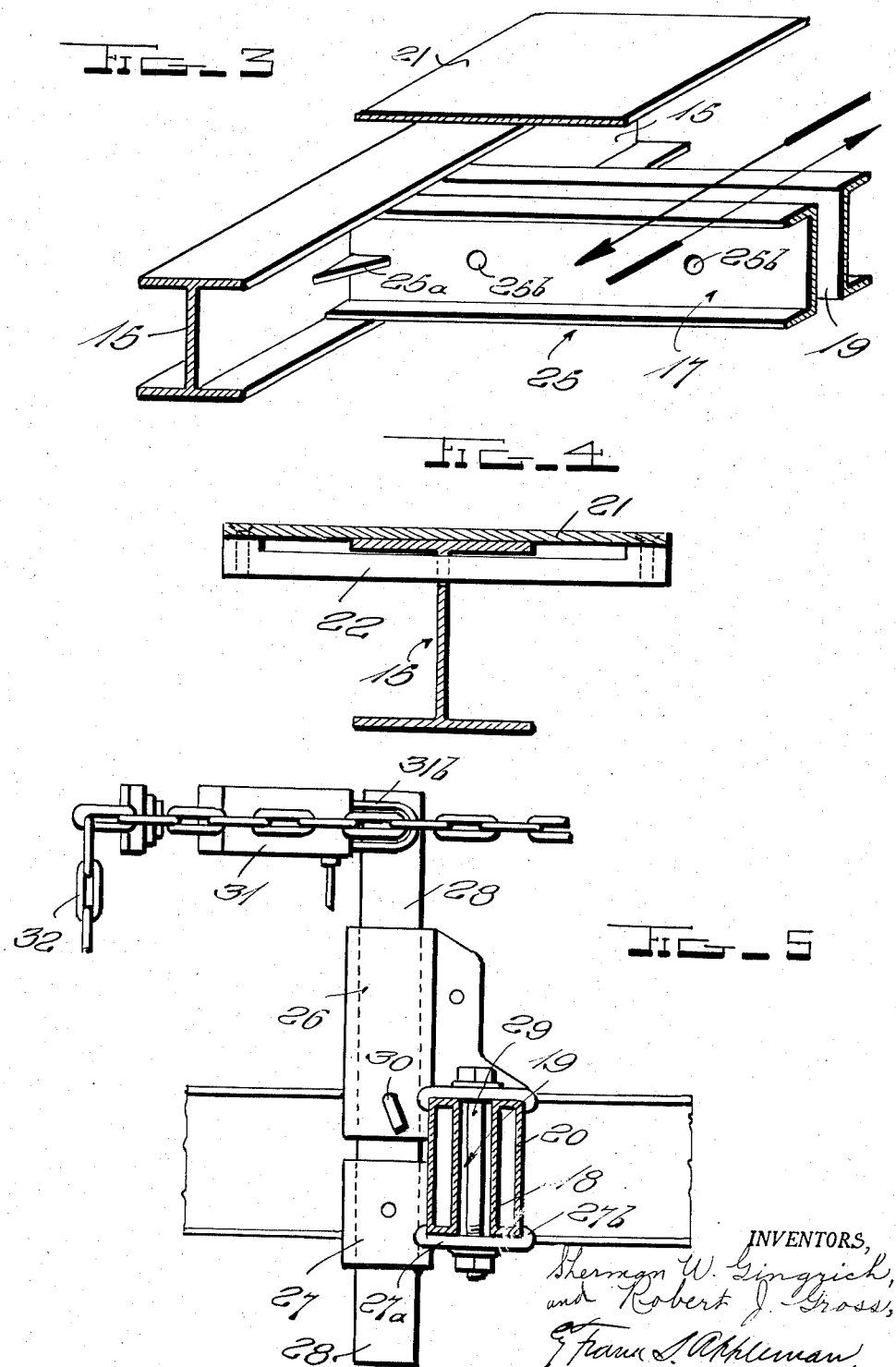

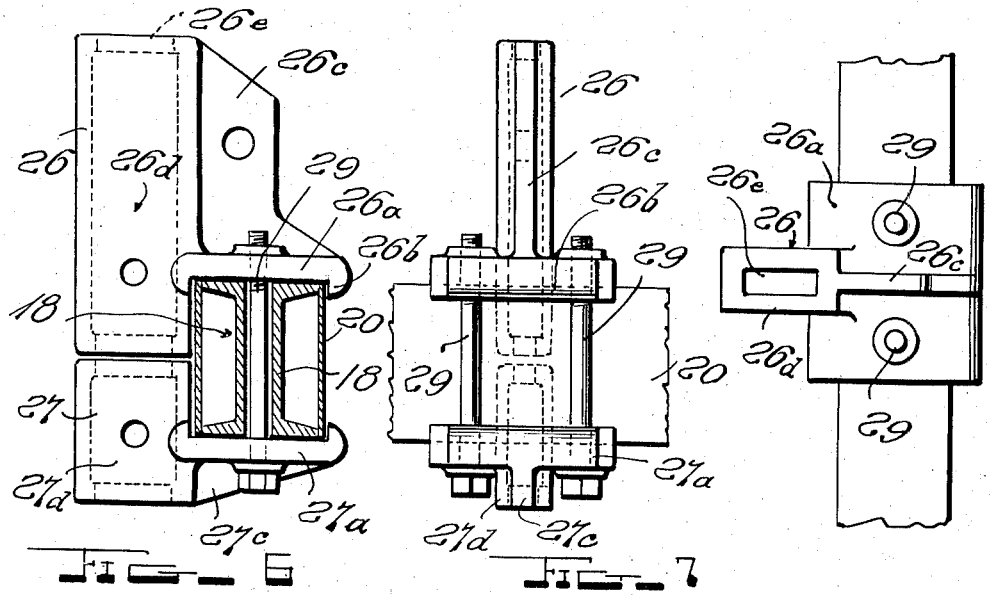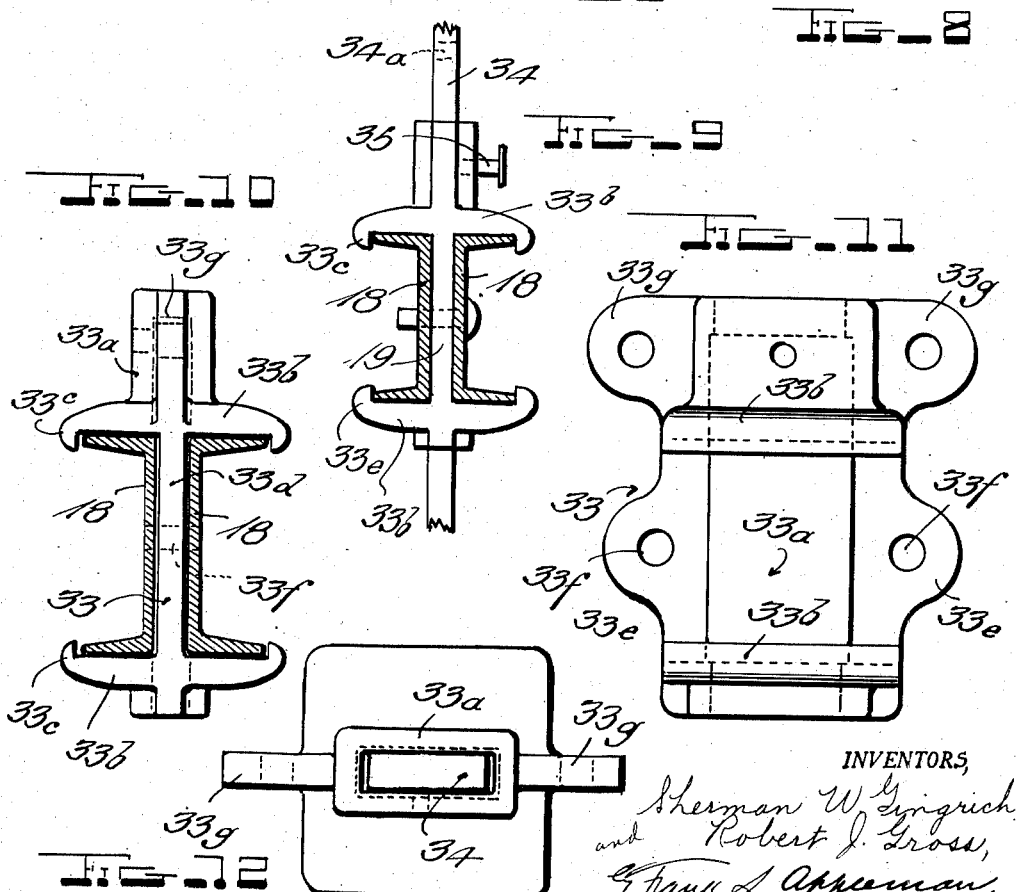

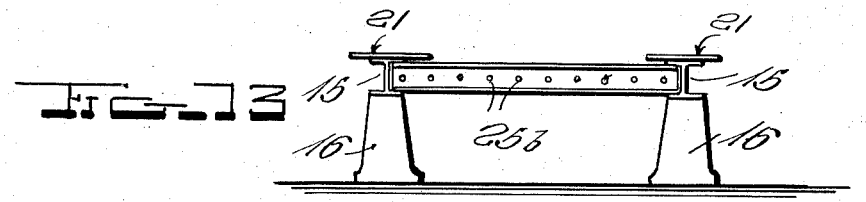
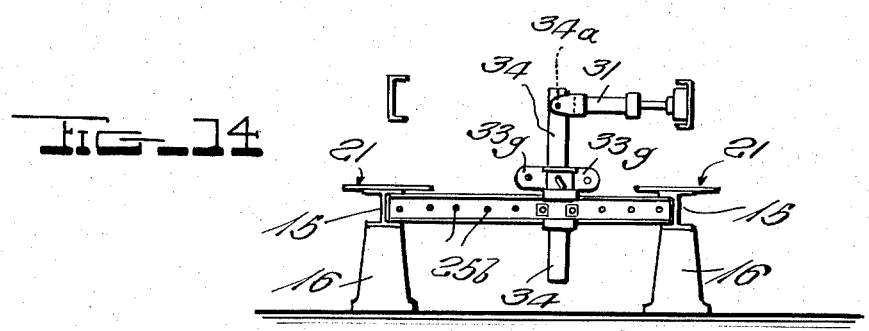
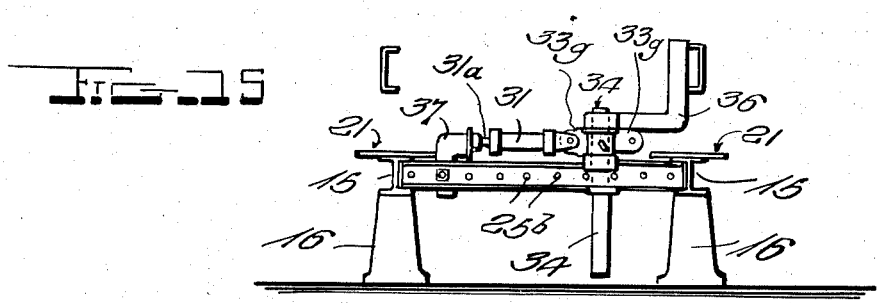
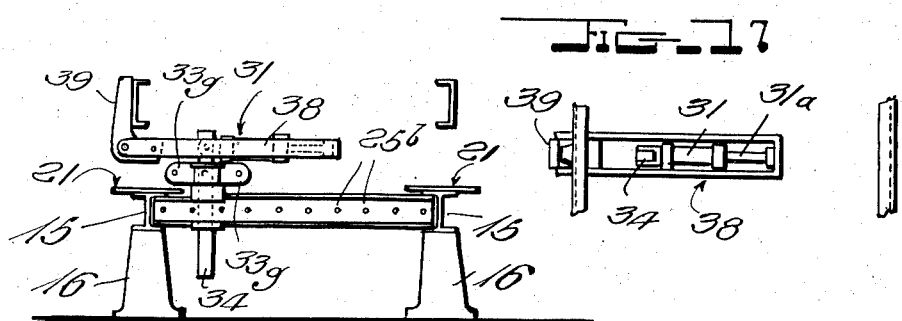

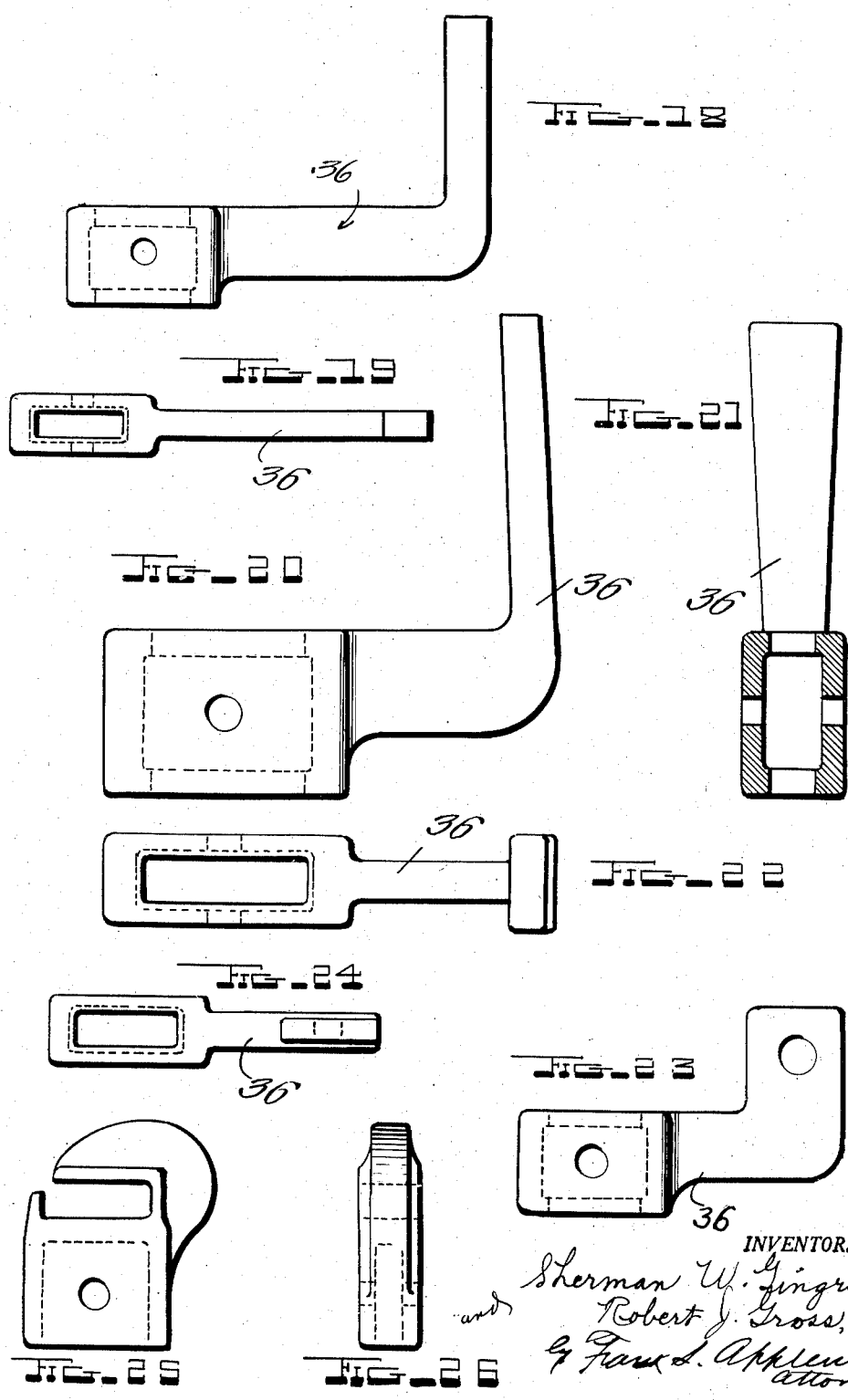

2,563,527

UNITED STATES PATENT OFFICE 2,563,527

FRAME STRAIGHTENING AND/OR TRUING APPARATUS

Sherman W. Gingrich, Le Claire, Iowa, and Robert J. Gross, Rock Island, Ill., assignors to Chief Alinement Corp., a corporation of Illinois Application November 8, 1946, Serial No. 708,654

4 Claims. (Cl. 153—32)

This invention relates to apparatus for straightening and/or truing the chassis frames of motor vehicles, structural shapes, and the like, and has particular relation to apparatus designed to overcome abnormal conditions found in such frames or shapes by the application of pulling and/or pushing pressures at proper points of such frames or shapes.

Chassis frames and structural shapes are generally produced by production methods which provide for accuracy of the normal product, so that the frame or shape is initially of the correct and desired form and condition. However, due to accidents and other untoward circumstances, when in service, such frames and shapes become misshaped or otherwise affected in such manner as set up undesired abnormal conditions which tend to reduce the serviceability of the structure. Since the abnormal conditions may be developed at a single or a plurality of points, and may be of a number of different types, the restoration of the frame or shape to substantially its normal condition requires many and varied operations. By the use of various types of gauging mechanism, it is possible to ascertain the character and location of the abnormalities; after this is done, however, it becomes necessary to provide the physical actions necessary to change the abnormal structure to one that is substantially normal. The present invention pertains to the latter part of the problems which must be solved.

Various developments have heretofore been provided for producing such result, these developments including various forms of apparatus designed to meet the conditions of the particular problem of an individual frame or shape structure. These developments have generally been of a more or less complicated type, thus tending to make the apparatus costly in production and operation, and requiring more or less specialized labor to produce an efficient result; the cost to the owner of the frame or shape for correcting the abnormalities is thus generally high, as well as excessively time consuming.

The present invention is designed to produce efficient results with an apparatus that is greatly simplified and yet is capable of meeting the various types of problems that arise in such abnormality-correction service. The invention involves a rigidly-constructed framework which is designed to support the frame or shape, such framework being designed also to support what may be termed a semi-rigid floating counter framework, in that parts thereof are freely positionable relative to the rigid framework so as to permit location at a desired local point, with such part serving to support the unit structures which are to be employed at such localized position. The units are themselves in the form of an assemblage of members, with some of the members usable in units of different type, the latter including a pressure-development means, the unit being designed to permit the application of pressure—pulling or pushing—at the localized point, with the unit temporarily anchored relative to the framework, thus causing the assembly to provide a structure in opposition to the frame abnormality, with the pressure means operative to remove the specific abnormality. Hence, a unit can be built up into an assemblage designed to meet the specific type of problem involved in correcting the abnormality, making it possible to provide the required structure for meeting the needs of a specific "job" in a simple and efficient manner, and then operating such structure for the purpose of efficiently correcting the specific abnormality.

The assemblage is of a simplified type with the various structures employed capable of being fabricated into various types of units, so that the particular needs for correcting a specific abnormality can be readily fashioned and applied to the transversely extending structural formation which is to form the anchorage therefor and which serves as a reaction member in applying the pressure, whether the latter be of pulling or pushing characteristic. Hence, the assemblage is generally flexible as to development and therefore particularly applicable for meeting the problem characteristics met in providing the abnormality correction.

To these and other ends, therefore, the nature of which will be more clearly understood as the invention is hereinafter disclosed, said invention consists in the improved constructions and combinations of parts as hereinafter more particularly described, illustrated in the accompanying drawings, and more particularly pointed out in the appended claims.

In the accompanying drawings in which similar reference characters indicate similar parts in each of the views, Figure 1 is a schematic plan view of an assemblage according to the present invention.

Figure 2 is a schematic side elevation of the same.

Figure 3 is a fragmentary perspective view showing the mounting of a floatable structural formation on the rigid framework.

Figure 4 is a detail cross sectional view of a part of the rigid frame and showing the adjustable runway.

Figure 5 is a detail sectional view taken on line 5—5 of Fig. 1.

Figure 6 is an enlarged view of a portion of the structure shown in Fig. 5, with the member shown in side elevation.

Figure 7 is an end view of parts shown in Fig. 6.

Figure 8 is a plan view of structures shown in Figs. 6 and 7.

Figure 9 is a detail cross section taken on line 9—9 of Fig. 1.

Figure 10 is a view of parts shown in Fig. 9 with such parts shown on an enlarged scale.

Figure 11 is a side elevation of parts shown in Fig. 10.

Figure 12 is a plan view of parts shown in Figs. 10 and 11.

Figure 13 is a cross section taken on line 13—13 of Fig. 1.

Figure 14 is a schematic view of the formation shown in Fig. 13 and carrying a unit assemblage of one form for applying pushing pressure on a side of the positioned chassis frame.

Figure 15 is a view similar to Fig. 14, but showing a different arrangement of unit members for producing a similar action.

Figure 16 is a view of the type of Fig. 14 but showing the unit assemblage as arranged to apply pulling pressure on a chassis frame.

Figure 17 is a schematic plan view of parts shown in Fig. 16.

Figure 18 is a side elevation of one form of member usable as a unit member.

Figure 19 is a plan view of the same.

Figures 20, 21 and 22 are, respectively, a side elevation, end view, and plan view of another form of member of the unit assembly.

Figures 23 and 24 are, respectively, side elevation, and plan view, of still another form of the unit member.

Figures 25 and 26, are, respectively, a side elevation and an end view of a hook member designed to be cooperative with the chassis frame and usable in connection with the present invention.

The assemblage which makes up the present invention is made up of a number of separate constructions which are designed to be made cooperative in carrying out the purposes of the invention. It may be noted, that no provision is made in the present invention for the preliminary gauging of the abnormal frame, this assemblage not being used for such purpose. The present invention assumes that the various abnormalities of the frame have been ascertained and localized and that the operator has obtained a general picture of the operations necessary to correct the abnormality.

The invention contemplates the use of a rigid framework, and is produced in the following manner:

15, 15 indicates a pair of I-beams, each having a length sufficient to receive and support a motor vehicle, these beams being mounted on and secured upon stationary pedestals 16 permanently positioned at the point where the service is to be performed, the pedestal being of suitable form and of the requisite number to provide for efficient support; since the motor vehicle rests upon the assemblage with its wheels in contact with the runway, it will be generally sufficient to provide a pair of pedestals for the I-beams with these located approximately below the points where the wheels rest in the assemblage, it being understood that the I-beams are of sufficient strength to meet the conditions of the service.

The opposite end zones of the pair of beams 15—the latter being in parallelism—are connected by transversely extending structural formations 17 which are anchored to the inner side faces of the webs of the beams and practically fit between the inner flanges of such beams; a structural formation of this type is located in each end zone and serves to maintain the spacing of the beams, as well as to form an extremely rigid framework, generally oblong, and designed to prevent distortion of such framework assemblies in presence of the stresses which are placed thereon in service. Each of such structural formations is formed of a pair of structural elements of channels 18, each of which is formed with a web and outwardly extending flanges at the top and bottom of such web. In practice, said elements 18 have their webs extending in spaced parallelism so as to provide a space 19 therebetween for a purpose hereinafter described; if desired, each element may also have a wall 20 connecting the free edges of the upper and lower flanges of an element. The opposite ends of the elements are anchored to the respective beams 15.

If desired, and such is preferred, a structural formation such as above described, is also located at an intermediate point in the length of the frame, preferably at the mid point, such formation being indicated at 17a and being designed to reinforce the intermediate points of the I-beams so as to preserve the rigidity of such framework; formation 17a is similar structurally to formation 17 and is likewise anchored to the I-beams.

The I-beam zone of the framwork is designed to support the motor vehicle that may be positioned thereon. However, since motor vehicles have different tread widths, and the abnormality condition may include distorted effects between the tread widths of the front and rear wheels of the vehicle, it is preferred to provide the actual runways as separate from but supported by the top faces of the I-beams. These are in the form of elongated plates 21 having a length at least equal to that of the I-beams, and a width materially in excess of the width of such I-beams. Since the tread widths of the vehicle may vary, each plate 21 is arranged to be shiftable laterally on its I-beam, this being provided by a sufficient number of supporting members 22 of somewhat U-shaped formation, with the upstanding ends secured to the under face of plate 21, and with the bottom connection extending through an opening formed in the web of the I-beam, the number of such structures being as preferred and located at proper points in the length of plate 21. Such structures permit a plate to be shifted laterally of the I-beam and thus assure a proper runway for the vehicle which is to undergo treatment.

In view of the fact that it may be necessary to correct the shape of the frame or the axle or wheel positions, plate 21 is preferably formed with a depressed zone 21a designed to receive an auxiliary plate 23 of smaller length dimension than the depressed zone; the top of plate 23 extends in the same plane with the top of plate 21. Such depressed zone is preferably located in the end zone of the framework, and preferably at that end which is opposite the end over which the vehicle is moved onto the assemblage, provision being made for the use of a suitable ramp 24 readily attached to the opposite end of plates 21.

Since the invention contemplates anchoring the vehicle in position on the framework, it is obvious that since the abnormalities present may be such as to force a change in the position of one or more of the wheels in correcting the abnormality, the two plates 23 are utilized, thus making it possible for the plate to compensate for any change in position of a wheel during the treatment, doing this without forcing wheel rotation, since the plate 23 is slidable on the depressed zone of plate 21. Since it is generally the front wheels of the vehicle which are located on plates 23, while the rear wheels will be braked against rotation, it will be apparent that the straightening and truing frame may be readily provided without affecting the assemblage in any way.

The beams 15 also carry a plurality of additional transversely extending structural formations, indicated at 25, these, however, not being anchored to the I-beams, being designed to be adjustable at will in the direction of length of the beams. These formations, as with the end zone formations are each formed of a pair of structural elements or channels having vertical webs and outwardly extending flanges at the top and bottom edges thereof, as with the end zone formations, each of the channel webs, however, having, additionally, a laterally extending flange 25a located substantially midway of the width of the web, and having a somewhat triangular contour, these flanges being located between the upper and lower flanges of the channel and providing an extended contact of the end of the formation with the web of the I-beams, thus tending to produce stability against wobbling of the channel and to maintain its adjusted position. The pair of channels are spaced apart similarly to those of the end zone formations, with the spacing designed to receive members of the unit formations. One or more of such pairs are located on each side of the formation 17a and while they fit within the I-beam structures, they are freely adjustable and thus can be considered as "floatable" in the sense that they can be shifted lengthwise of the beams to any desired localized point between the anchored formations.

The elements forming a floatable formation are also provided with a plurality of spaced apart openings 25b, preferably in the mid zone of the web with the series of openings extending in the direction of length of the web, the openings of the two channels of the formation being alined. These are designed to receive pins or the like, designed to be used in connection with the mounting of units.

As heretofore referred to, the vehicle after being driven onto the runway formed by plates 21 is designed to be anchored against movements thereon other than those provided by the apparatus being used in the straightening and/or truing operation. This anchoring is provided by the use of an anchoring unit designed to be mounted on the rigid end zone structural formations and purposed to be active on the end zones of the vehicles as, for instance, by being operatively connected with the ends of the chassis frame or other vehicle part or parts. As with other of the units as presently described, the anchoring unit is made up of an assemblage of members which serve to apply pressure—pulling or pushing, as the case may be—on the vehicle so as to retain it in position, the anchoring unit in one end zone of the runway being designed to produce pressure exerted in the direction opposite that exerted by the similar unit of the opposite end zone, thus firmly locating the vehicle in position with the vehicle capable of withstanding the pressures applied by other units during the straightening or truing operation.

In addition, such units are capable of correcting abnormalities such, for instance, as disturb the desired relationship between the ends and the sides of the chassis frame, making it possible to straighten or true the frame in this respect through the opposing pressures that are being produced by such positioned anchoring units, the latter making it possible to restore the desired relation between the chassis frame ends and sides, should the latter have been rendered abnormal or otherwise.

The anchored unit used in connection with the end zone structural formations is shown more particularly in Figs. 5 to 8, in which 26 indicates an upper member and 27 a lower member, these being designed to position and support a bar 28.

Member 26 is in the form of a casting which includes a plate element 26a having downwardly extending flanges 26b, said plate being designed to overlie the upper zone of the structural formation, with the flanged portions serving to prevent spreading of the two elements of the structural formation in presence of pressures, said plate element having an extended length sufficient to provide for the positioning of the two spaced apart bolts 29 adapted to extend upward through the spacing between the structural elements or channels forming the structural formation; since member 27 has an approximately similar plate element 27a designed to overlie the lower zone of the structural formation, the bolts 29 will connect said members 26a and 27a and provide an assembly relative to the structural elements or channels of the structural formation so as to set up an extremely rigid assemblage so designed as to provide a definite anchoring relationship for the parts hereinafter referred to and at the same time prevent the structural formation itself from movement out of its designed position. As is apparent, loosening of bolts 29 will permit the elements 26a and 27a to be shifted lengthwise of the space between channels to a desired position and in this way locate the unit at any desired position in the length of the structural formation, after which, tightening of the bolts will provide the rigid effect referred to.

Element 26a carries an upstanding web 26c intermediate the bolts, with the web leading to an elongated vertically extending element 26d which is generally hollow, with its cross sectional dimensions oblong in contour and with its long sides extending in planes parallel to the planes of the web 26c, element 26d being symmetrical relative to the web with its width dimension such that the width of the opening through the element approximately equals that of the width of the web, the walls of the element 26d being of sufficient length as to provide for resistance against variation under heavy pressure condition. The opening in element 26d, indicated at 26e, is designed to receive the bar 28 which has a cross section such as to provide a working fit with the walls of the opening. Element 26d carries a threaded member 30 by which it is possible to hold the bar 28 in any desired vertically adjustable position.

Member 27a is formed with the upstanding flanges 27b similar to flanges 26b of the member 26a, and is also provided with a web 27c which is also symmetrically located similar to web 26c and an element 27d of similar type to element 26d and vertically alined therewith; element 27d is of shorter length than element 26d and forms practically a continuation of the latter for supporting bar 28. If desired, element 27d may also carry a threaded element corresponding to element 30, thus providing for positioning of the bar by both elements 26d and 27d with the bar adjustable vertically within the openings of the two elements.

Bar 28, which fits margins of members 26 and 27, thus has a cross section corresponding to the shape of such marginal openings, being oblong in cross section with its greatest width extending transverse to the direction of length of the structural formation to which it is attached. The bar is designed to form the equivalent of an abutment capable of resisting the pressures which may be applied thereto, such pressures emanating from a suitable pressure-producing assemblage 31 which may be of any of a number of well known types—such as a jack, for instance—and is preferably power operated as by air or hydraulic agencies. The structure 31 includes a piston 31a carrying a head and which cooperates with a suitable formation designed to provide the opposing element for producing the pressure reactions. For instance, the second element may be a structure designed to cooperate with a link of a chain or chain loop 32, a free end of which is provided with a suitable hook structure adapted to engage the frame or axle of the vehicle; when pressure is applied to the piston of the structure 31, the pressure effect is made manifest on the chain and thus provides a pulling stress upon the frame or axle. Obviously, in producing this result, the bar 28 must be capable of providing the maximum resistance against yielding under the pressures provided. Generally, the structure 31 is secured to the upper end zone of the bar, the structure carrying a pair of ears 31b designed to overlie the sides of the bar, the bar and the ears having an opening for the passage of a bolt or pin designed to anchor the structure to the bar.

As will be understood, such mounting of structure 31 on bar 28 tends to set up a very powerful leverage effect on the assemblage including the structural formation, with the leverage tending to apply a twisting action on such formation. Hence, the assemblage which provides the mounting for the bar thus described is so formed as to firmly unite the structural elements of the formation into a complete assembly cooperative with the flanges of the beams 15 and the securing anchorage between the beams and the formation so as to produce maximum resistance to such twisting action.

While such assembly, shown more particularly in Fig. 5 is designed to cooperate with the frame in setting up endwise pressures upon the frame or the axle, the assemblage which utilizes the chain 32 as a part of the structure is capable of being used under other conditions, as long as the supporting assembly is such as to provide the equivalent of bar 28. In practice, conditions may arise where a chain-included structure of this type is especially adapted for providing a particular operation on the frame; attention is being called to this as this point to indicate that the chain arrangement is not limited to service in connection with the supporting structure which operates in conjunction with the anchored structural formations.

A similar structure is used with the structural formation at the opposite end of the runway, it being understood, of course, that the pressure application of the latter would generally be in directions opposite of the structure at the other end. And since the structure at both ends is capable of adjustment longitudinally of the structural formation, it will be understood that the assemblages need not be in longitudinal alinement but can be offset with respect to each other, so that the pulling strains would be exerted in direction angular to the direction of length of the beams; such offset relation is indicated in Fig. 1. Obviously more than one of such unit assemblies may be carried by an anchored structural formation should the "job" require the multiple use, the units being individually adjustable.

The units used with the floatable transversely extending structural elements 25 are somewhat different than those employed in connection with the end zone fixed structures which have been described in detail. These units for structures 25 are more or less of a fabricated character, being made up of parts selected to meet individual conditions involved in the straightening or truing operations. However, each of them is based on the use of a casting 33 of a special type and which will now be described. The casting 33 comprises a hollow body portion 33a having a vertical length greater than the vertical width of the channels which form the structure 25, such body portion having spaced apart laterally extending wings 33b extending in opposite directions from the body axis and which are designed to overlie the outer faces of the flanges 25, the wings being spaced apart a distance sufficient to receive the vertical width of the channels, with the wings each having its outer ends provided with a lateral extension 33c, thus forming a space for the reception of the flanges of the channel, the walls of such space serving to prevent spreading of the channel. The body, between the opposing wings, is designed to extend vertically through the space between the pair of channels which form the laterally extending structural formation 25, thus providing a unitary structure of wings and body which, when in position, firmly secure the channels in the desired relationship to form the structural formation. The intermediate body, indicated at 33d is enlarged in the direction of its plane, as at 33e, said enlargements being on opposite side edges of such body, with each enlargement having an opening 33f, the two openings being spaced apart distances equal to the distance between the openings 25b of the channels.

The body above the upper wings 33b extends upwardly a suitable distance and is provided with perforated ears 33g, these ears being designed to permit attachment of other members of the unit which may be employed at the particular point. The body extends a short below the lower wings for the purpose of providing an efficient support. As previously pointed out, the body is hollow, being arranged to permit of the positioning of a supporting bar 34, therethrough in a vertical direction, said bar being adjustable in height by the use of a set screw 35 carried by the upper portion of body 33a.

Due to the particular form of the casting, it is assembled with the channels 25 prior to the positioning of the channels within the rigid frame, the channels and the casting being assembled while the ends of the channels are exposed, with the intermediate portion of the body between the channels, after which the end zones of the channels are connected by bolts so as to make a proper assemblage in which the casting can be shifted bodily in the direction of length of the channels to any desired point. The assemblage is then introduced into the rigid structure in such assembled form. As is apparent, this places the casting as a permanent part of the structural formation, and since the latter itself is adjustable in the direction of length of the rigid framework, while the casting is adjustable in the direction of length of the structural formation, it is understood that it is possible to locate the unit very accurately relative to the position at which it is desired that it should serve.

As is obvious, the assemblage of the various laterally extending structural formations will be provided by first locating an end zone formation within the fixed runway indicated by beams 15, after which a desired number of floatable formations are inserted—shown as two—followed by the intermediate fixed formation and then by the floatable formations of the opposite side of the intermediate formation, with the opposite end zone formation finally completing the assembly.

It will be understood that member 33 is free to move in the direction of length of the channels 25. To provide the desired resistance for service conditions, the openings 33f are alined with adjacent openings 25b and suitable pins passed through the alined openings, thus anchoring the member 33 against movement in the direction of length of the floatable transversely extending supporting structures provided by the pair of channels 25. Since the pair of channels are themselves held by the end bolts against separation, the positioned member 33 and the channels form an assembly which is practically made rigid through the presence of the wings 33b which prevent spreading of the channels; and since such assemblage is practically held against tilting action by the location of its ends relative to the beams 15, the assembly, although floatable in the direction of length of the runway, is practically held rigid in any position in which it may be placed.

It may be noted that bar 34, as well as bar 28, presents its greater width in the direction in which pressure is to be applied, so that an ample support is provided such as will present a maximum resistance effect for the action of the jack 31 which is utilized for providing the straightening action; as is apparent, the direction of width of the bar 28, which is used in connection with the end zone structural formations, deals with pressures which extend in the direction of length of the frame being treated; on the other hand, the width of bar 34 extends transversely of the direction of length of the frame and are designed for use in connection with the straightening of the sides of the frame, the floatable structural formations being positioned at the desired point where the pressure application will be exerted directly transversely of the frame.

In the floatable assembly just described, it will be understood, of course, that each of the floatable structures will carry the casting 33 as a permanent part of the assemblage. However, the bar 34 is normally out of its working position, being utilized only when pressure is to be applied, being similar in this respect to bar 28. Like bar 28, bar 34 is vertically adjustable in its supporting structure, being movable vertically within such structure and then held to position by the tightening of the set screw 35. For the purpose of connecting other parts, the bar 34 may and preferably does have an opening 34a in its upper zone.

As shown in Figures 13 to 24, there are associated with this assemblage including member 33 and bar 34, a number of structural members or elements designed to make possible the application of the pressure of jack element 31 on the frame being straightened. These include various elements which are more or less individual to a particular service, and may or may not be used, as the conditions may require. For instance, in Fig. 14, the straightening assemblage is simply provided by properly adjusting bar 34 as to height, and connecting the ears of the jack element directly to the bar by passing a pin through the element ears and opening 34a, the jack element 31 then having its piston operative between the upstanding bar 34 and the frame, a suitable pressure block being interposed between the end of the piston and the frame; when the actuating fluid is introduced into the element 31 to advance the piston of the element, the rigidly supported bar 34 provides the resistance through which the pressure of the jack element is made effective on the inner side of the frame.

It is possible that the conditions of the operation are such that the bar 34 must be located rather close to the frame, due to the presence of other parts of the chassis, in which case, a somewhat changed operation is developed. For instance—Fig. 15—one of a series of L-shaped members 36 may be applied to the end of bar 34, with the foot of the element extending upward and cooperating with the chassis frame. In such case, the jack element 31 would be connected with an ear 33g on the side of the bar opposite that in which element 36 extends, with the element 31 cooperative with an L-shaped member 37 which has its leg depending between the channels 25 and is secured relative to one of the openings 25b, member 37 thus becoming the resistance structure; in this arrangement, member 33 is not secured in pinned position relative to the channels. The jack element 31, by its piston movement will thus shift member 33 bodily on the channels in the direction in which pressure is being provided, the pressure being initially exerted against element 33 carrying bar 34 and then through the latter to element 36.

Where the pressure to be applied is to be exerted inward of the frame, the assemblage shown in Figs. 16 and 17 is preferably employed, the ears of the jack element 31 being connected to the bar 34, as above explained, and the piston end being made operative in connection with the bottom zone of a U-shaped member 38, the latter having its ends extending beyond the frame and having such ends connected with an L-shaped member 39 which extends upward onto the outer side of the frame. When the jack element 31 is made active, its piston applies pressure upon member 38 and thereby moves the latter inward, thus applying pulling pressure upon the frame.

Most of the elements 36 are designed to be mounted on the bars 34, and these, although varying as to configuration and designed to meet specific problems which may be encountered in the straightening operations, each generally includes a hollow base portion with the opening therethrough complemental to the cross section of a bar 34, and each having an opening therethrough for the passage of a pin which extends through such opening and the opening 34a of the bar, the base being dimensioned so as to prevent rocking action of the element on the bar. Several forms of elements 36 are shown in the drawings, and additional forms along similar lines are contemplated within the invention.

It will be understood, of course, that elements, such as 39, designed to be used under pulling conditions, will have their shapes such as to provide for proper securing of the element to the U-shaped member 38.

In addition, it is apparent that an element of the type of element 36 may, in addition (see Figs. 23 and 24), have an arm perforated to serve as a support for the eared end of the jack element 31, to meet certain conditions, especially in connection with the structure designed to be carried by the end zone structural formations, the element in such case having the base structure referred to and being designed to be carried by the upper end of bar 28, thus being used in connection with the applied pressure longitudinally of the positioned frame; the member is usuable in other relations.

In other words, the invention contemplates the use of fundamental structures, as, for instance, the beams 15 and the fixed and floatable transversely extending structural formations, which serve to rigidly position an element such as the adjustable bars 28 and 34 at definite points relative to the frame, these structures being designed to set up a resistance element such as to produce an abutment-like effect which is extremely rigid and capable of affording the resistance needed when dealing with frame members such as are found in the frames of motor vehicles; the jack element 31 is powerful in producing pressure, and the resistance needed must be capable of withstanding the pressure developments. Hence, the underlying feature is that of setting up an abutment-like structure capable of providing the needed resistance values, and yet be of such flexible type in operation as to be capable of locating such abutments very accurately relative to the frame which is undergoing the straightening or truing operations. The accurate positioning of the abutment structure then makes it possible to utilize one or a collection of elements which, when properly assembled with the bars 28 or 34, provide the proper and desired pressure applications upon the positioned frame.

As a result, it is possible to provide the needed variations in structure necessary to meet the varied operating conditions by the use of elements such as 36 and the like and which are comparatively small and relatively inexpensive, the variations thus being practically within the zone between the bar 28 or 34 and the frame, the main variations otherwise being in connection with the two ways shown for supporting the bars, one of these being that used in connection with the fixed structural formations—the structure supporting bar 28—and the structure for supporting bar 34 which is carried by the floatable structural formation, these latter variations being shown in the drawings and assuring that the bars 28 and 34 will be so supported as to produce the abutment-like effect which is desired.

From the above, it can be seen that the present invention is particularly adapted to meet the extremely severe conditions which confront an apparatus designed to overcome the difficulties which are set up through the need for straightening and/or truing the frame of the chassis. Due to the fact that, through accident or otherwise in which the damaged vehicle became engaged, the particular point of the frame which may need attention is impossible to actually foresee, and the character of the damage may have any of a multitude of different characteristics, makes it almost impossible to provide apparatus capable of meeting all of the possible conditions which may be met, excepting by the use of complicated structures, where the structure is designed to meet a particular condition; and where the structures are of such type, not only is the cost of the structures, as well as their manipulating costs, relatively high, but the time consumption in providing the straightening and/or truing action is increased by the necessity for substituting large and expensive structures to meet the conditions of the operation.

In the present invention, the needs are met by an assemblage which is more or less of general simplicity and less costly. This result is obtained by developing fundamental features which are applicable for service under all conditions, and providing these features of such a flexible type that these fundamental structures become usable under practically all operation conditions, requiring only adjustment, and then combining with these fundamental features a plurality of small and inexpensive elements or members designed to meet the individual characteristics of a particular problem.

For instance, the mounting of the vehicle in proper position for the operations is generally the function of the structures carried by the structural formations at the opposite ends of the fixed vehicle supporting means in the form of the longitudinal I-beams; the structures for this service are so arranged that, additionally, they are also used in connection with pressures which must be applied in the direction of length of the chassis frame, this portion of the invention being so arranged as to serve both functions. The floatable structural formations are permanently located within the assemblage, but are adjustable therein, and these carry the castings which support the vertically extending bars, all as a part of the normal assemblage; hence, the adjustment of the floatable formations is mainly the need to meet a particular condition, the vertically extending bar then positioned in the formation that is to be rendered active, after which it is necessary only to apply to the bar or to the casting, one or more of the members which make up the particular type of unit which is needed in providing the straightening operation in the sides of the chassis frame; and since these elements, as well as the bars, may be used with either of the positioned structural formations, it can be understood that the number of parts for meeting the individual conditions is relatively small, thus making it possible to provide a complete assemblage at a reasonable installation cost and making the maintenance costs also reasonable, while the operation is greatly simplified, since the ability to use the same element at different points and the flexibility in the arrangement of the elements to set up a structure capable of meeting a particular condition, are such as to make the entire operation comparatively simple.

While a few of the smaller elements are disclosed for the purpose of showing the general type of structure usable as such elements, it will be understood that other forms are contemplated and can be readily supplied to meet particularly onerous conditions.

While we have herein shown and described a preferred assemblage for carrying out the purposes of the invention, it will be readily understood that changes and/or modifications therein may be found desirable or essential in meeting the exigencies of use or the individual desires of the user, and we therefore desire to be understood as reserving the right to make any and all such changes and/or modifications as may be found desirable or essential, insofar as the same may fall within the spirit and scope of the invention as expressed in the accompanying claims, when broadly construed.

We claim:

1. An apparatus for straightening and/or truing chassis frames of motor vehicles and the like comprising a pair of supporting I-beams arranged in spaced apart relationship, transversely extending members rigidly connected to said beams adjacent the ends thereof between the flanges of the beams, a plurality of transversely extending structural formations supported by and longitudinally movable along the I-beams, each formation including a pair of spaced apart channel members arranged in back to back relationship with the flanges extending outwardly and having their ends supported by the flanges of the I-beams, and laterally extending flanges on each end of the channel members for engaging the web of each I-beam to stabilize the structural formation, said laterally extending flanges being located between the flanges of the channel members and extending a substantial distance beyond the ends of the flanges of the channel members.

2. The combination with the apparatus claimed in claim 1 of a plate of extended width mounted upon and extending longitudinally of each I-beam to form a travel path and a support for wheels of the vehicle in positioning the vehicle, the width of the plate exceeding the width of the I-beam, said plates having their side zones supported by a plurality of bridging supports extending laterally of and through the webs of the I-beams to thereby permit positioning of the plates relative to the anchored I-beams to compensate for wheel spacing distances while maintaining the plates support by the I-beams, each plate including a depressed zone for receiving a supplemental plate section movable in the direction of length of such zone and with the supplemental plate continuing the plane of the top of the main plate, the depressed zones and associated plates being positioned to support the wheels of one end of the motor vehicle.

3. The combination with the apparatus claimed in claim 1 of a plate of extended width mounted upon and extending longitudinally of each I-beam to form a travel path and a support for wheels of the vehicle in positioning the vehicle, the width of the plate exceeding the width of the I-beam, said plates having their side zones supported by a plurality of bridging supports extending laterally of and through the webs of the I-beams to thereby permit positioning of the plates relative to the anchored I-beams to compensate for wheel spacing distances while maintaining the plates support by the I-beams, each plate including a depressed zone for receiving a supplemental plate section movable in the direction of length of such zone and with the supplemental plate continuing the plane of the top of the main plate, the depressed zones and associated plates being positioned to support the wheels of one end of the motor vehicle, said depressed zones being located in the end zones of the plates opposite the plate ends which receives the ramp over which the vehicle advances to its position in the apparatus.

4. The combination with the apparatus claimed in claim 1 of an additional transversely-extending structural formation of the same construction as the previously claimed transversely extending formation anchored to the I-beams within the mid zone of the length of the latter to thereby provide an intermediate bracing-truss effect for the I-beams for such mid zone to support the beams.

SHERMAN W. GINGRICH.
ROBERT J. GROSS.

REFERENCES CITED

The following references are of record in the file of this patent:

UNITED STATES PATENTS

| Number | Name | Date |
|---|---|---|
| 1,889,187 | Wochner | Nov. 29, 1932 |
| 1,891,490 | Wochner | Dec. 20, 1932 |
| 1,907,925 | Wochner | May 9, 1933 |